United States Patent [19] | [11] 4,215,623
Byers, Jr. | [45] Aug. 5, 1980

[54] HYDRAULIC VELOCITY AND ACCELERATION CONTROL SYSTEM

[75] Inventor: James O. Byers, Jr., Manchester, N.H.

[73] Assignee: Sanders Associates, Inc., Nasua, N.H.

[21] Appl. No.: 895,692

[22] Filed: Apr. 12, 1978

Related U.S. Application Data

[63] Continuation of Ser. No. 231,212, Mar. 2, 1972, abandoned.

[51] Int. Cl.² ..................... F15B 13/042; F16K 11/00

[52] U.S. Cl. .................................. 91/461; 137/625.63

[58] Field of Search ............... 91/461, 304; 137/625.6, 137/625.63, 625.66, 625.64; 251/28, 29

[56] References Cited

U.S. PATENT DOCUMENTS

| | | | |
|---|---|---|---|
| 2,400,126 | 5/1946 | Matthews | 91/461 X |
| 2,582,088 | 1/1952 | Walthers | 91/461 |
| 2,830,785 | 4/1958 | Buri | 251/29 |
| 2,980,073 | 4/1961 | Arbogast | 91/461 X |
| 2,993,477 | 7/1961 | Panissidi | 137/625.63 |
| 3,129,645 | 4/1964 | Olmsted | 91/461 |
| 3,234,857 | 2/1966 | Castelet | 91/461 X |
| 3,561,488 | 2/1971 | Byers . | |
| 3,643,696 | 2/1972 | Christensen et al. | 137/625.6 |

*Primary Examiner*—Irwin C. Cohen
*Attorney, Agent, or Firm*—Louis Etlinger; Joseph E. Funk

[57] ABSTRACT

A hydraulic control system particularly suitable for controlling the acceleration and velocity of a load such as the plunger of die casting equipment is described. The load is controlled by a hydraulic ram which in turn is controlled by a main valve of the kind in which the rate of flow of fluid to the load is directly proportional to the rate of flow of pilot fluid thereto. Pilot fluid flows through an auxiliary valve and a restrictor. The restrictor is adjusted to determine the maximum rate of flow and the rate at which the auxiliary valve opens is adjusted to determine the rate of change of flow.

4 Claims, 2 Drawing Figures

HYDRAULIC VELOCITY AND ACCELERATION CONTROL SYSTEM

This is a continuation, of application Ser. No. 231,212, filed Mar. 2, 1972 and now abandoned.

FIELD OF THE INVENTION

This invention relates generally to hydraulic control systems and particularly to such systems which are suitable for controlling the acceleration and velocity of a hydraulic actuator such as the shot cylinder of die casting machinery.

BACKGROUND

In the art of die casting, a charge, or "shot" of material, such as molten metal, is forced into all the interstices of the die by means of a plunger. It has been found that the quality of the resulting casting depends to a great extent on the manner in which the acceleration and the velocity of the plunger varies during the operation. For a specific casting, it is often found, through a combination of therby and experiment, that a particular program of plunger acceleration and velocity produces a very good casting. Die casters frequently make a record of such a program, or velocity profile, as it is sometimes called, and attempt to repeat the profile for each subsequent casting. Accordingly, it is highly desirable to be able to vary and control the acceleration and velocity as desired and to repeat any profile found to be satisfactory.

The die casting plunger is frequently controlled by a means of a hydraulic ram, or shot cylinder, which in turn may be controlled by any of various systems. In one system, sometimes referred to as the "on-off" system, the shot cylinder is controlled by a four or five way main valve which in turn is controlled by an assembly of many adjustable valves which are individually adjusted and opened progressively to obtain the desired profile. Because of the many adjustments required, the set up of such an arrangement is quite time consuming. The system is not pressure compensated and, despite careful record keeping it has been found difficult to obtain the same velocity profile repeatedly.

Another system which has been used to control the shot cylinder is an electro-mechanical servo system using a multi-stage servo valve. An electric programmer generates a voltage which varies in accordance with the desired velocity throughout the cycle. This voltage is compared with voltages indicative of actual velocity and of output valve spool position to generate an error signal which is amplified and applied to the input of the servo valve. Such a system can establish an acceptable velocity profile but the electrical control equipment is complex and costly.

It is an object of the present invention to provide an improved control system capable of producing an acceptable velocity profile yet which is both inexpensive and reliable

SUMMARY OF THE INVENTION

Briefly stated, a control system incorporating the present invention includes a main valve connected to supply fluid to the load. This valve is of the kind in which the rate of flow of fluid to the load is proportional to the rate of flow of pilot fluid to the valve. An auxiliary valve and a restrictor are serially connected between a source of pilot fluid and the main valve.

Means are also provided for opening the auxiliary valve at a controlled rate. The size of the restrictor determines the maximum rate of flow of pilot fluid while the rate at which the auxiliary valve is opened determines the rate of change of the flow of pilot fluid to the main valve.

DESCRIPTION OF PREFERRED EMBODIMENT

For a clearer understanding of the invention reference may be made to the following detailed description and the accompanying drawing in which.

Figure 1:
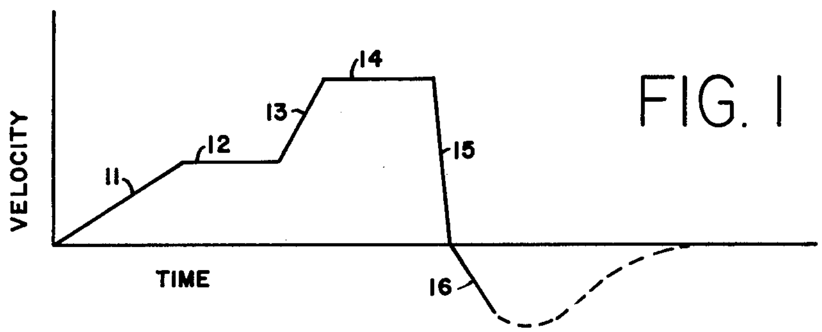
FIG. 1 is a graph useful in explaining the invention.

Referring first to FIG. 1, there is shown a graph representing a typical velocity profile of the plunger of a die casting apparatus. The plunger starts accelerating at a uniform controlled rate during the time represented by the portion 11 of the graph. When a predetermined velocity is reached, this velocity is held constant for another predetermined time as represented by the portion 12 of the graph. Next, the velocity is increased at a more rapid rate, as indicated by the portion 13 of the graph, until it reaches a second predetermined velocity at which it is held at this velocity for another predetermined length of time as indicated by the portion 14 of the graph. Finally, the velocity of the plunger is reduced to zero, as indicated by the portion 15 of the graph, after which the plunger is retracted as indicated by the portion 16 of the graph.

As previously mentioned, the quality of a casting depends to a great extent on the velocity profile of the plunger when the casting is made. It is highly desirable that the apparatus be capable of reproducing precisely a velocity profile which has been found to be satisfactory. As can be seen from the graph, a typical profile includes a portion of slow acceleration, and a portion of uniform low velocity, then a portion of greater acceleration and finally a portion of higher velocity. Apparatus capable of producing a family of profiles of such as shown in FIG. 1, with adjustable slow and fast accelerations and adjustable low and high velocities, is shown in FIG. 2.

Figure 2:
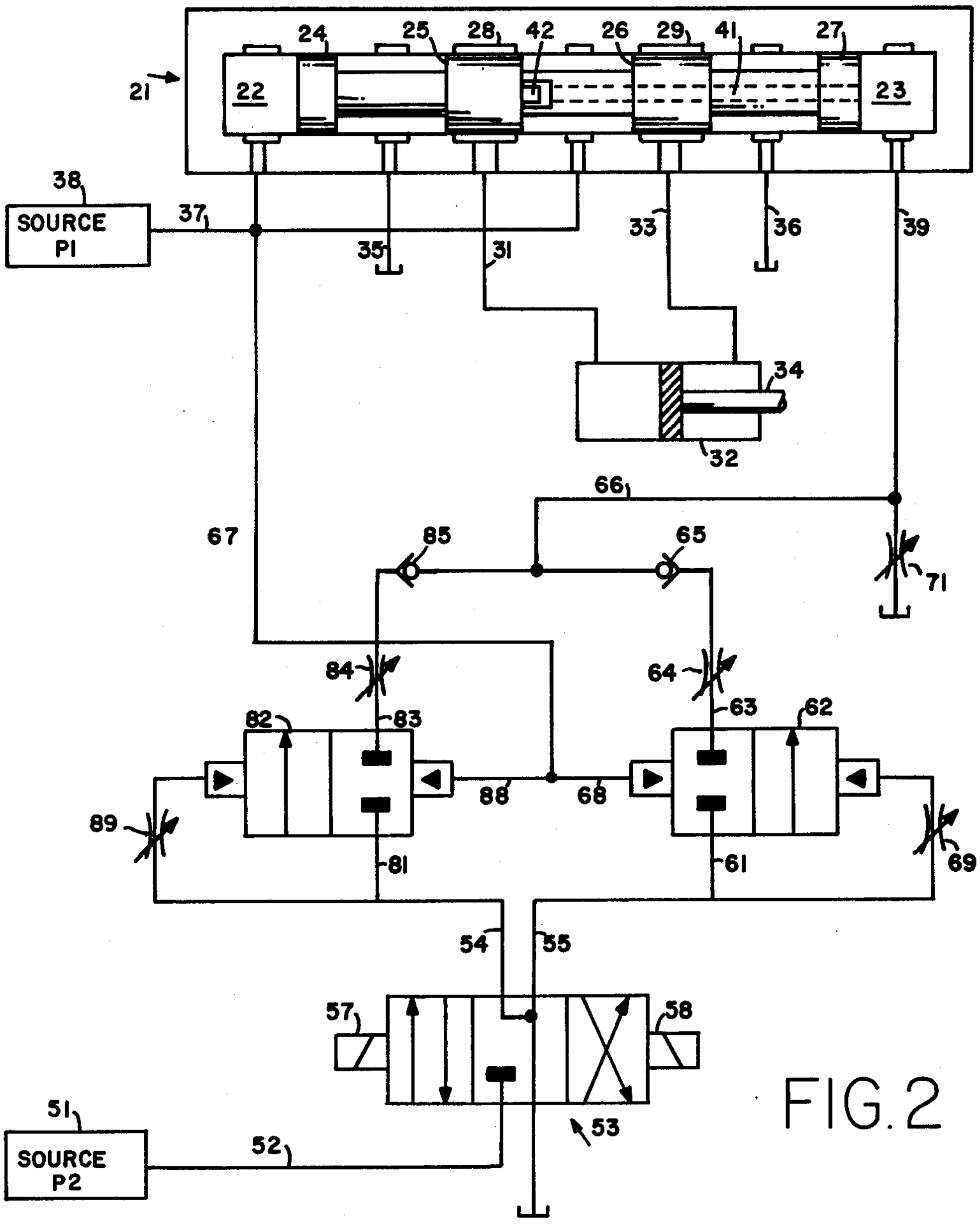
FIG. 2 is a schematic diagram of a preferred embodiment of the invention.

Referring now to FIG. 2 there is shown a main flow control valve indicated generally by the reference character 21 which includes a hollow cylinder including end spaces 22 and 23. Within the hollow cylinder is a valve spool including the lands 24, 25, 26 and 27. The lands 24 and 27 are at opposite ends of the spool and are subjected to the pressures within the end spaces 22 and 23 respectively. The lands 25 and 26, in the neutral position of the valve shown, occlude two load ports 28 and 29, respectively, the former of which is connected by means of a conduit 31 to the head end of a hydraulic ram or shot cylinder 32 while the latter is connected by means of a conduit 33 to the rod end of the shot cylinder. The piston rod 34 of the ram may be connected to actuate the plunger of the die casting machinery. The region of the hollow cylinder of the valve 21 between the lands 24 and 25 is connected by means of a conduit 35 to the reservoir or tank and the region between the lands 26 and 27 is similarly connected by means of a conduit 36 to the reservoir. The region between the lands 25 and 26 is connected by means of a conduit 37 to a source 38 of fluid under pressure. This source is also connected to the end space 22. The end space 23 is connected by means of a conduit 39 to the control apparatus. The spool of the valve 21 is formed with a longitudinal passageway 41 which extends from the end space 23 through the interior of the spool and communicates with a flow control slot 42 adjacent to that face of the land 25 which is exposed to the pressure P1. The valve 21, including the passageway 41 and the slot 42, may be similar to the valve described in U.S. Pat. No. 3,561,488 granted Feb. 9, 1971 to the present applicant and entitled "Fluid Flow Control Valve". As more fully explained in the patent, when pilot fluid is admitted to the end space 23, the spool is displaced and fluid flows through the passageway 41 into slot 42 and to the load. The spool is displaced until this flow reduces the pressure in the end space 23 to equal the biasing pressure in the opposite end space 22. Fluid also flows from the pressure source 38 through the opening around the land 25 into the load port 28 and this latter flow is exactly proportional to the pilot flow.

A source 51 of fluid under pressure P2, higher than the pressure P1, is connected by means of conduit 52 to one port of a four way valve indicated generally by the reference character 53. This valve is constructed so that, in the neutral position, the pressure conduit 52 is closed off while the two load conduits 54 and 55 are both connected to the reservoir. The valve 53 is actuated in opposite directions by means of solenoids 57 and 58, respectively. When the former is actuated, the pressure source is connected to the load conduit 54 while the reservoir is connected to the conduit 55. When the solenoid 58 is actuated the pressure source is connected to the load conduit 55 and the load conduit 54 is connected to the reservoir. The valve 53 is designated a profile selection valve and serves to connect the pressure to either the load conduit 54 or 55 so as to select either the first acceleration and slow velocity of the profile or alternatively to select the second acceleration and high velocity portion.

Actuation of the solenoid 58 connects the pressure to the conduit 55 and it selects the first acceleration, low velocity portion of the profile. The conduit 55 is connected by means of a conduit 61 to the input port of the valve 62, the output port of which is connected by means of a conduit 63 to a variable restrictor 64 which in turn is connected through a check valve 65 to a conduit 66 which in turn is connected to the previously mentioned conduit 39. The pressure source 38 is connected through conduits 37, 67 and 68 to the left end of the valve 62 so as to urge it to a closed position in which the input 61 and the output 63 are closed off. A variable restrictor 69 interconnects the conduit 55 with the right end of the valve 62 so as to urge the valve in a direction to connect the input conduit 61 with the output conduit 63.

OPERATION

Initially, the spool of the valve 21 is displaced to the right of the neutral position shown by the pressure of the source 38 acting through the end space 22 against the left end of the spool. The right end space 23 is connected through the conduit 39 and through a variable restrictor 71 to the reservoir. Therefore, the spool initially moves to the right thereby connecting the source 38 through the conduit 37, the valve 21, and the conduit 33 to the rod end of the shot cylinder 32 thereby retracting the plunger. When the plunger is to be moved forward, the solenoid 58 is energized thereby connecting the source 51 to the conduit 55. Since the pressure of the source 51 is greater than that of the source 38, the resulting pressure on the right end of the valve 62 starts to open it. The rate at which this valve is opened is controlled by adjusting the restrictor 69. This in turn will adjust the rate at which the flow through the valve 62 increases and will in turn adjust the rate at which pilot flow to the main valve 21 increases. Since the flow of fluid to the shot cylinder 32 is exactly proportional to the flow of pilot fluid to the end space 23, the adjustment of the rate of increase of the flow of pilot fluid will adjust the rate of increase of velocity of the plunger, or in other words, will adjust the acceleration of the plunger. Therefore, adjustment of the restrictor 69 adjusts the slope of the portion 11 of the curve shown in FIG. 1. The restrictor 64 controls the maximum rate of flow of fluid through the valve 62 and thus defines the point at which the portion 11 of the curve of FIG. 1 changes to the portion 12 and likewise determines the height of the portion 12, that is, the rate of flow of fluid through the valve 21 and the resulting velocity of the connecting rod 34.

It is to be noted that the slope of the portion 11 of the curve can be adjusted easily by adjusting the restrictor 69. Similarly, the velocity represented by the curve 12 may be adjusted by adjusting the restrictor 64. These portions of the curve can be accurately reproduced at any time simply by noting the adjustment of these two restrictors and returning to them as desired. It is also to be noted that the operation has been explained as if the entire flow from the valve 62 flowed into the end space 23. Strictly speaking, this is not correct because some is bled off through the variable restrictor 71. However, this restrictor is of such a size that the flow of fluid therethrough is small compared with the rate of flow normally occurring through the conduits 66 and 39 that the resulting departure from linearity is not great.

After a predetermined time, the portion 12 of the profile may be terminated and the portion 13 started by de-energizing solenoid 58 and energizing the solenoid 57. This connects the source 51 to the conduit 54 and, through a conduit 81 to a valve 82 which is analogous to the valve 62 and which is connected to the valve 21, the source 38 and the valve 53 through an analogous group of components including a conduit 83, a variable restrictor 84, a check valve 85, a conduit 88 and a variable restrictor 89. These components operate to generate the portions 13 and 14 of the profile of FIG. 1 in exactly the same way as the portions 11 and 12 were generated as previously described. After another predetermined time, when the shot is completed, both of the solenoids 57 and 58 may be de-energized thereby removing the connection of the source 51 to the end space 23. The restrictor 71 allows the pressure in the end space 23 to fall so that the source 38, acting on the end space 22 will displace the valve spool to the right thereby connecting pressure through the conduit 33 to the rod end of the shot cylinder thereby retracting the plunger. As the solenoids 57 and 58 are de-energized, the velocity of the plunger will fall rapidly which is indicated by the portion 15 of the curve 51 and will reverse as shown by the portion 16, as the cylinder is retracted.

From the foregoing it will be apparent that Applicant has provided an improved velocity and acceleration control system. It is capable of generating a large family of acceleration and velocity profiles each portion of which may be adjustable. Additionally, each profile may be repeated by simply returning the restrictors to the settings which produced the satisfactory profile. The system is made from simple, inexpensive readily obtainable components.

Although a specific embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. A control system for controlling the rate of flow of fluid and the rate of change of such flow to a load which system includes a main valve adapted to be connected to supply fluid to a load, said valve being of the kind in which the rate of flow of fluid to the load is proportional to the rate of flow of pilot fluid to the valve CHARACTERIZED in that there is provided a source of pilot fluid, an auxiliary valve and a restrictor serially connected between a source of pilot fluid and said main valve, and in that there is also provided means for opening said auxiliary valve at a controlled rate, whereby the size of the restrictor determines the maximum rate of flow of pilot fluid to the main valve and whereby the rate at which the auxiliary valve is opened determines the rate of change of such flow, said control system including means for biasing said auxiliary valve towards a closed position, said means for biasing including an additional source of fluid under a pressure less than that of said source of pilot fluid and a fluid connection between said additional source and said auxiliary valve.

2. A control system in accordance with claim 1 in which said means for opening includes an auxiliary fluid connection between said source of pilot fluid and said auxiliary valve.

3. A control system in accordance with claim 2 which includes an auxiliary adjustable restrictor interposed in said auxiliary fluid connection.

4. A control system, comprising:

a hydraulic actuator;

a first source of fluid under pressure;

a second source of pilot fluid under a pressure higher than that of said second source;

a flow control valve having the property of delivering fluid to its output at a rate proportional to that at which pilot fluid is furnished thereto and being connected to control the flow of fluid from said sources to said actuator; and apparatus interconnecting said second source and said flow control valve for controlling the rate of flow of pilot fluid to said valve, characterized in that said apparatus includes an adjustable auxiliary valve, interposed in the path between said second source and said flow control valve, and also includes means for urging said auxiliary valve towards a closed position and means for applying the pressure of said second source to urge said auxiliary valve towards an open position, said control system also including means for applying the pressure of said first source to said valve to urge it to a closed position.

* * * * *